United States Patent
Katoh (10) Patent No.: US 9,459,412 B2
(45) Date of Patent: Oct. 4, 2016

(54) OPTICAL CONNECTOR RECEPTACLE, RECEPTACLE HOUSING, OPTICAL CONNECTOR ADAPTER, AND ADAPTER HOUSING

(71) Applicant: FUJIKURA LTD., Koto-ku, Tokyo (JP)

(72) Inventor: Seiji Katoh, Sakura (JP)

(73) Assignee: FUJIKURA LTD., Tokyo (JP)

( * ) Notice: Subject to any disclaimer, the term of this patent is extended or adjusted under 35 U.S.C. 154(b) by 364 days.

(21) Appl. No.: 14/075,546

(22) Filed: Nov. 8, 2013

(65) Prior Publication Data

US 2014/0133807 A1    May 15, 2014

(30) Foreign Application Priority Data

Nov. 9, 2012    (JP) .................................. 2012-247698

(51) Int. Cl.
G02B 6/36    (2006.01)
G02B 6/38    (2006.01)

(52) U.S. Cl.
CPC ........... *G02B 6/3821* (2013.01); *G02B 6/3885* (2013.01); *G02B 6/3893* (2013.01)

(58) Field of Classification Search
CPC . G02B 6/3821; G02B 6/3885; G02B 6/3893
USPC .................................................... 385/76, 78
See application file for complete search history.

(56) References Cited

U.S. PATENT DOCUMENTS

2002/0118926 A1* 8/2002 Shimoji ............... G02B 6/3821
                                                                        385/76
2006/0094273 A1    5/2006 Mine et al.
2007/0211997 A1    9/2007 Saito et al.

FOREIGN PATENT DOCUMENTS

| CN | 1769937 A | 5/2006 |
|---|---|---|
| CN | 101034192 A | 9/2007 |
| CN | 102377492 A | 3/2012 |
| EP | 1041416 A2 | 10/2000 |
| JP | 10-170760 A | 6/1998 |
| JP | 3111711 U | 7/2005 |
| JP | 2005-345589 A | 12/2005 |

(Continued)

OTHER PUBLICATIONS

JIS C 5964-7. Fiber optic connector interfaces-Part 7: Type MPO connector family (F13).
JIS C 5981. F 12 Type Connectors for optical fiber ribbons (MT connectors).

(Continued)

*Primary Examiner* — Jerry Blevins
(74) *Attorney, Agent, or Firm* — Sughrue Mion, PLLC (57) ABSTRACT

An optical connector receptacle of the invention includes: a receptacle housing holding a ferrule; a flange protruding from an external surface of the receptacle housing; an elastic deformation portion extending from the flange along the external surface of the receptacle housing; and a locking protruding portion protruding from the elastic deformation portion to the opposite side of the external surface of the receptacle housing. The optical connector receptacle is attachable to an attachment wall by sandwiching a peripheral edge of an attachment hole of the attachment wall between the flange and the locking protruding portion. A state where the locking protruding portion is locked by the peripheral edge of the attachment hole of the attachment wall is releasable as a result of elastically deforming the elastic deformation portion to be directed to the external surface of the receptacle housing.

19 Claims, 8 Drawing Sheets

(56) References Cited

FOREIGN PATENT DOCUMENTS

| | | |
|---|---|---|
| JP | 2007-078740 A | 3/2007 |
| JP | 4090067 B2 | 5/2008 |
| JP | 2009-109730 A | 5/2009 |
| JP | 4818666 B2 | 9/2011 |

OTHER PUBLICATIONS

Communication dated Jan. 5, 2015 from the State Intellectual Property Office of P.R. China in counterpart application 201310556605.4.

* cited by examiner

OPTICAL CONNECTOR RECEPTACLE, RECEPTACLE HOUSING, OPTICAL CONNECTOR ADAPTER, AND ADAPTER HOUSING

CROSS REFERENCE TO RELATED APPLICATIONS

This application claims priority from Japanese Patent Application No. 2012-247698 filed on Nov. 9, 2012, the contents of which are incorporated herein by reference in their entirety.

BACKGROUND OF THE INVENTION

1. Field of the Invention

The present invention relates to an optical connector receptacle, a receptacle housing, an optical connector adapter, and an adapter housing, which are attachable to an attachment hole of an enclosure, a panel, or the like.

2. Background Art

Conventionally, as optical connectors which are attachable to an attachment hole of a panel or the like, an adapter, a receptacle, or the like is known. Such optical connectors are used in optical modules, light trays, backplane connectors, or the like.

Japanese Unexamined Patent Application, First Publication No. H10-170760 discloses an optical connector; the optical connector includes: a first holder having a cylindrical shape and movably holding one ferrule in the axis direction; an adapter that is integrated with the front end thereof; and a second holder having a front end and statically holding another ferrule at the front end thereof. Furthermore, the optical connector includes: an optical connector plug that is freely inserted into or removed from an insertion opening of the adapter; an elastic locking end that locks the optical connector plug so as to prevent it from being removed; a pressing means pressing against one ferrule and butt-jointing said one ferrule to a splice edge face of another ferrule; and a coupling that is externally-inserted onto the second holder, fitted into the adapter, and thereby locks the elastic locking end so as to make it impossible to bend.

Japanese Unexamined Patent Application, First Publication No. 2007-78740 discloses an optical connector receptacle including: a housing into which an optical connector plug provided at a front end of an external optical fiber is inserted and fitted; a ferrule provided at a front end of a substrate-side optical fiber; and a coil spring pressing against the ferrule from the rear edge side thereof where the coil spring is a tapered spring.

Japanese Unexamined Patent Application, First Publication No. 2005-345589 discloses a removal jig for an adapter that causes an attachment panel to be fixed to and sandwiched between an attachment flange provided at an outer central portion and a pair of plate springs fixed to outer surfaces parallel to each other; and the removal jig includes a pair of opposed ends that bends a pair of plate springs and allows the free end thereof to move a position at which the attachment panel is not sandwiched.

Registered Utility model No. 3111711 discloses a clasp used for attaching an optical adapter, the clasp includes an outer-peripheral frame portion and an elastic locking claw which are provided a pair of opposed side plate portions bending and extending from both ends of a connection plate portion, a curved engagement portion is formed at a facing portion facing an inner surface of a through hole of a panel of the outer-peripheral frame portion, and the curved engagement portion elastically engages with at least a portion of the inner surface of the through hole.

Japanese Patent No. 4090067 discloses a shutter includes: a pair of locking portions that causes the shutter to be inserted into a housing in the fitting-removing direction with respect to the other side optical connector and thereby holding the shutter in the housing; and a pair of pressing portions that are formed on the opposite side of the locking portion in the fitting-removing direction and used for pressing the shutter when the housing is inserted into the shutter, wherein the pair of locking portions and the pair of pressing portions are formed outside in a width direction of a light shielding portion.

Japanese Unexamined Patent Application, First Publication No. 2009-109730 discloses an adapter attachment structure in which an adapter main body is inserted into an attachment hole, an attachment flange portion provided at the border of the adapter main body is in contact with a hole edge of the attachment hole, the attachment flange portion is sandwiched between a supporting arm portion and an attachment panel, the supporting arm portion provided at a locking tool, and the locking tool is freely fitted or removed from a gap formed between the attachment hole and the adapter main body.

SUMMARY OF THE INVENTION

The invention was conceived in view of the above-described circumstances and has an object thereof to provide an optical connector receptacle, a receptacle housing, an optical connector adapter, and an adapter housing, which reduce the number of necessary parts used for attaching a housing to an attachment hole and can reduce the size of the parts.

In order to solve the above-described problems, the invention provides an optical connector receptacle including: a ferrule to which an optical fiber is inserted and fixed; a receptacle housing holding the ferrule; a flange protruding from an external surface of the receptacle housing; an elastic deformation portion extending from the flange along the external surface of the receptacle housing; and a locking protruding portion protruding from the elastic deformation portion to the opposite side of the external surface of the receptacle housing. The flange, the elastic deformation portion, and the locking protruding portion are formed integrally with the receptacle housing. The optical connector receptacle is attachable to an attachment wall by sandwiching a peripheral edge of an attachment hole of the attachment wall between the flange and the locking protruding portion. A state where the locking protruding portion is locked by the peripheral edge of the attachment hole of the attachment wall is releasable as a result of elastically deforming the elastic deformation portion to be directed to the external surface of the receptacle housing.

A configuration may be adopted in which the elastic deformation portion extends from the flange so as to be formed in a cantilever shape.

A configuration may be adopted in which the locking protruding portion is formed at a connector insertion portion side into which another connector is inserted with respect to the flange.

A configuration may be adopted in which the locking protruding portion has a recess into which a protrusion is to be inserted, and the protrusion protrudes from a pressing face of a jig pressing the locking protruding portion.

A configuration may be adopted in which the optical fiber includes a portion having a tape-shaped multi-core.

A configuration may be adopted in which the receptacle housing includes: a spring pressing against the ferrule; and an internal mechanism container accommodating a spring pusher receiving the spring.

A configuration may be adopted in which the receptacle housing has an opening portion at an end of the internal mechanism container opposite to a connector insertion portion into which another connector is inserted, the spring pusher includes a substrate portion blocking the opening portion, a bend portion bending from an end of the substrate portion along an inner surface of the internal mechanism container, and a locking claw protruding from the bend portion, and the receptacle housing includes an engagement portion engaging with the locking claw at a side surface of the internal mechanism container.

A configuration may be adopted in which the spring pusher has a through hole, through which the optical fiber passes, and has a spring applied part receiving the spring at a peripheral edge of the through hole.

Furthermore, the invention provides a receptacle housing including: a ferrule holder holding a ferrule to which an optical fiber is inserted and fixed; a flange protruding from an external surface of the receptacle housing; an elastic deformation portion extending from the flange along the external surface; and a locking protruding portion protruding from the elastic deformation portion to the opposite side of the external surface. The flange, the elastic deformation portion, and the locking protruding portion are formed integrally with the ferrule holder. The receptacle housing is attachable to an attachment wall by sandwiching a peripheral edge of an attachment hole of the attachment wall between the flange and the locking protruding portion. A state where the locking protruding portion is locked by the peripheral edge of the attachment hole of the attachment wall is releasable as a result of elastically deforming the elastic deformation portion to be directed to the external surface.

A configuration may be adopted in which the elastic deformation portion extends from the flange so as to be formed in a cantilever shape.

A configuration may be adopted in which the locking protruding portion is formed at a connector insertion portion side into which another connector is inserted with respect to the flange.

A configuration may be adopted in which the locking protruding portion has a recess into which a protrusion is to be inserted, and the protrusion protrudes from a pressing face of a jig pressing the locking protruding portion.

A configuration may be adopted in which the receptacle housing includes: a spring pressing against the ferrule; and an internal mechanism container accommodating a spring pusher receiving the spring.

Furthermore, the invention provides an optical connector adapter including: an adapter housing comprising a pair of connector insertion portions having ends into which other connectors are to be inserted; a flange protruding from an external surface of the adapter housing; an elastic deformation portion extending from the flange along the external surface of the adapter housing; a locking protruding portion protruding from the elastic deformation portion to the opposite side of the external surface of the adapter housing. The flange, the elastic deformation portion, and the locking protruding portion are formed integrally with the adapter housing. The optical connector adapter is attachable to an attachment wall by sandwiching a peripheral edge of an attachment hole of the attachment wall between the flange and the locking protruding portion. A state where the locking protruding portion is locked by the peripheral edge of the attachment hole of the attachment wall is releasable as a result of elastically deforming the elastic deformation portion to be directed to the external surface of the adapter housing.

A configuration may be adopted in which the elastic deformation portion extends from the flange so as to be formed in a cantilever shape.

A configuration may be adopted in which the locking protruding portion has a recess into which a protrusion is to be inserted, and the protrusion protrudes from a pressing face of a jig pressing the locking protruding portion.

Furthermore, the invention provides an adapter housing including: a pair of connector insertion portions having ends into which other connectors are to be inserted; a flange protruding from an external surface of the adapter housing; an elastic deformation portion extending from the flange along the external surface; and a locking protruding portion protruding from the elastic deformation portion to the opposite side of the external surface. The flange, the elastic deformation portion, and the locking protruding portion are formed integrally with the pair of connector insertion portions. The adapter housing is attachable to an attachment wall by sandwiching a peripheral edge of an attachment hole of the attachment wall between the flange and the locking protruding portion. A state where the locking protruding portion is locked by the peripheral edge of the attachment hole of the attachment wall is releasable as a result of elastically deforming the elastic deformation portion to be directed to the external surface.

A configuration may be adopted in which the elastic deformation portion extends from the flange so as to be formed in a cantilever shape.

A configuration may be adopted in which the locking protruding portion has a recess into which a protrusion is to be inserted, and the protrusion protrudes from a pressing face of a jig pressing the locking protruding portion.

Effects of the Invention

According to the invention, it is possible to reduce the number of necessary parts used for attaching a housing to an attachment hole and reduce the size of the parts.

BRIEF DESCRIPTION OF THE DRAWINGS

FIG. 6 is a perspective view showing a modified example of the optical connector receptacle having a different configuration such as a ferrule or the like.

DETAILED DESCRIPTION OF THE INVENTION

Hereinafter, the invention will be described based on a preferred embodiment with reference to drawings.

Figure 1A:
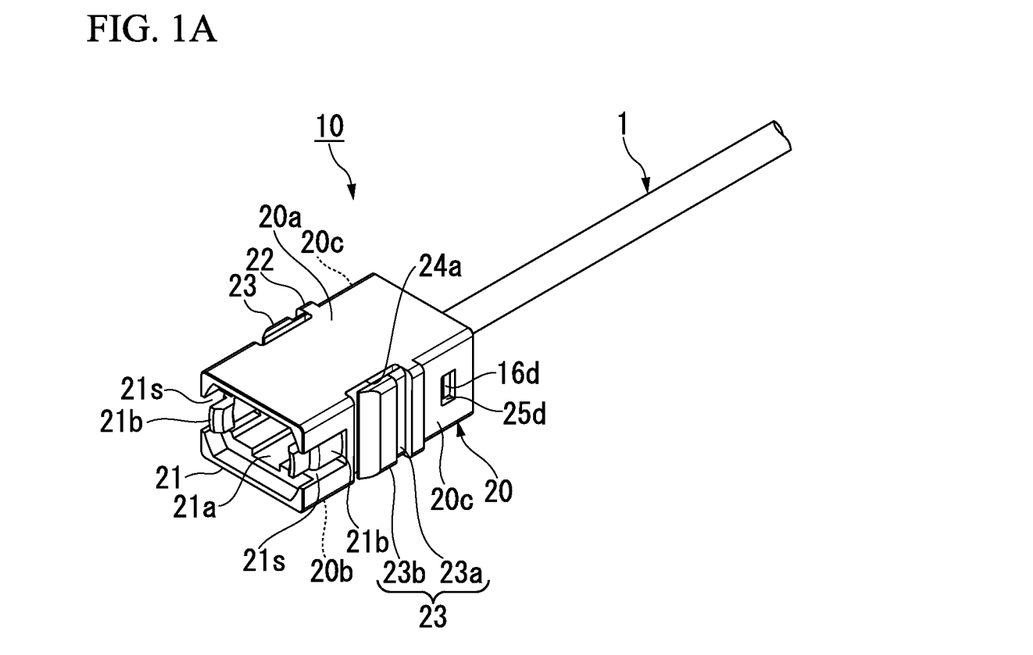
FIG. 1A is a perspective view showing an example of an optical connector receptacle of the invention.
Figure 1B:
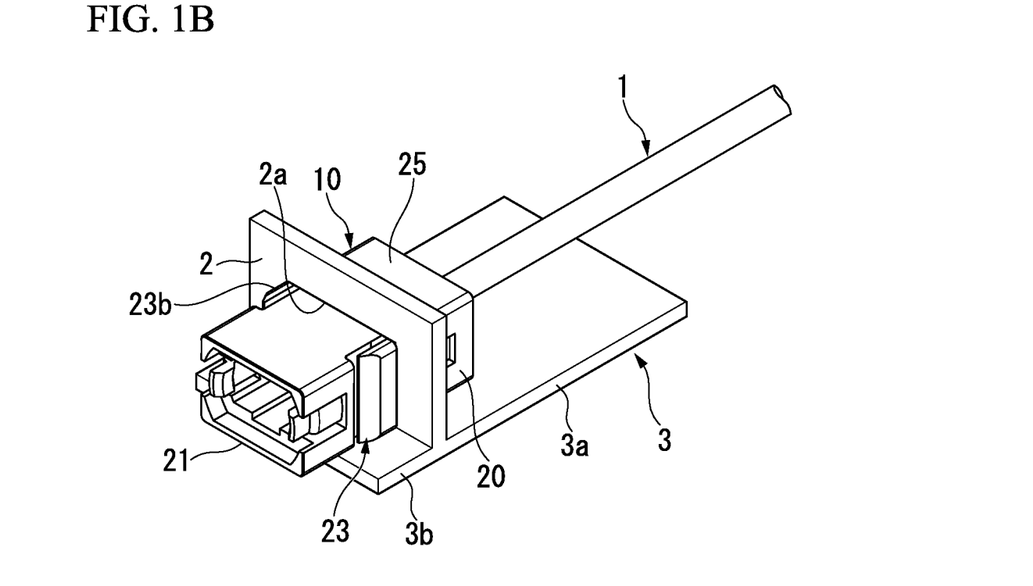
FIG. 1B is a perspective view showing an example of a state where an example of the optical connector receptacle of the invention is attached to an attachment hole.
Figure 12:
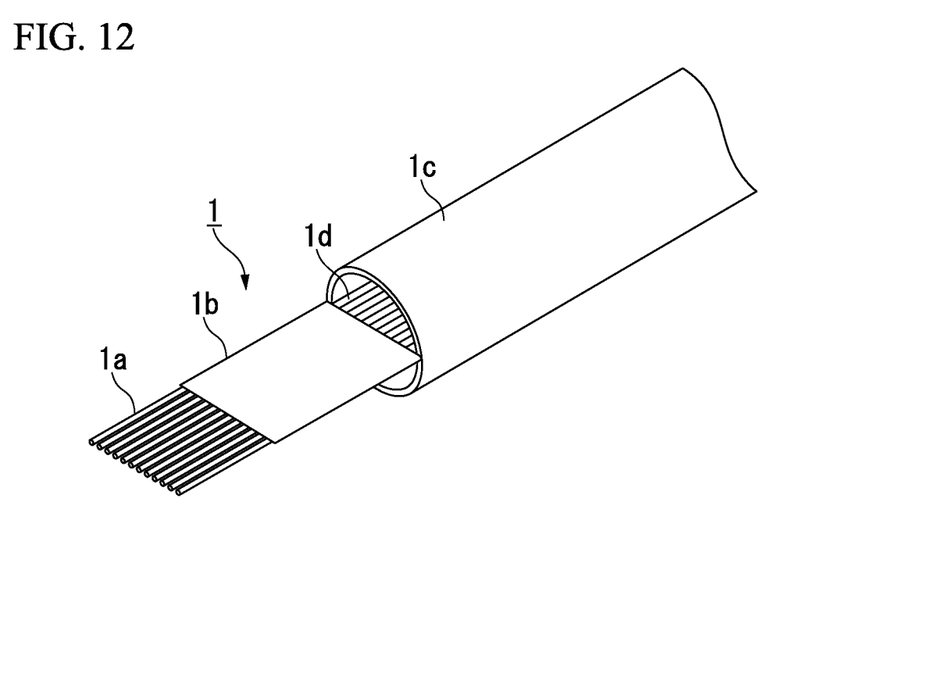
FIG. 12 is a perspective view showing an example of a front-end portion of an optical fiber.

As shown in FIGS. 1A and 1B, an optical connector receptacle 10 is provided with a receptacle housing 20 that accommodates an internal mechanism 17 (refer to FIG. 2) including a ferrule 11 to which a front-end portion of an optical fiber 1 is inserted and fixed (refer to FIG. 12).

In the case of the optical connector receptacle 10 shown in FIGS. 1A and 1B, the optical fiber 1 is an optical fiber code or the like having a tape-shaped portion 1b as shown in FIG. 12.

At the front-end portion of the optical fiber 1, a peripheral coating are removed, and a bare optical fiber 1a is thereby exposed.

As an optical fiber, silica-based glass fiber or the like is preferably used.

As a coating, for example, a resin coating having single layer, bilayer, or more than two number of layers is adopted.

If a plurality of optical fiber core wires 1d, each of which is formed of a single core (optical fiber having a resin coating), are accommodated in a tube 1c and a plurality of optical fibers is integrally coated with a resin coating outside the tube 1c so as to form the portion 1b having a tape-shaped multi-core, the bare optical fibers 1a are easily inserted into the ferrule 11, and the diameter of the tube 1c can also be reduced to be less than or equal to the width of the tape-shaped portion 1b.

As a method of manufacturing an optical fiber having the optical fiber core wires 1d, each of which is formed of a single core, a multi-core ribbon, or the tape-shaped portion 1b, (1) a method including: preparing a plurality of optical fiber core wires 1d, each of which is formed of a single core; forming a coating as a result of integrally coating the portion with resin or the like; and thereby forming a tape-shaped optical fiber ribbon; and (2) a method including: preparing a multi-core ribbon; separating the multi-core ribbon into an integrated-formed coating portion and a non-coating portion as a result of leaving an integrated-formed coating of the ribbon provided at the tape-shaped portion 1b and of suitably removing an integrated-formed coating provided at the other portion; and thereby forming a plurality of the optical fiber core wires 1d, each of which is formed of a single core, is adopted.

In other cases, an optical fiber used for the invention is not particularly limited to optical fiber core wires, an optical fiber code, an optical fiber cable, or the like, the other optical fiber can be adopted to the invention.

As the material of the tube 1c, an elastic material such as elastomer is preferably used.

Figure 2:
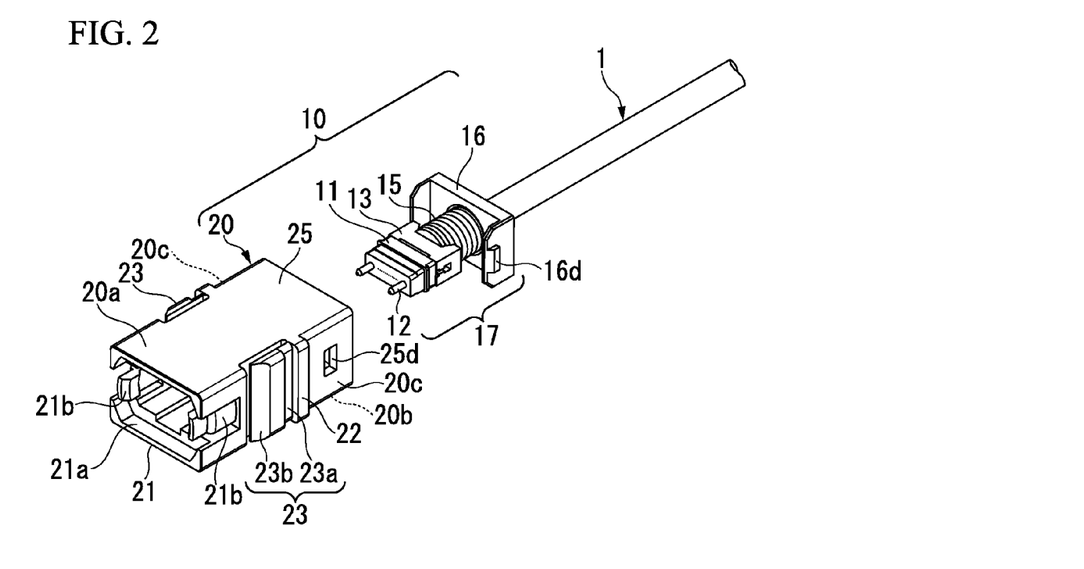
FIG. 2 is an exploded perspective view illustrating the optical connector receptacle shown in FIG. 1A.

As shown in FIGS. 1A and 2, the receptacle housing 20 has an outer shape having a substantially rectangular cuboid having a flat upper face 20a, a flat lower face 20b, and a pair of side faces 20c that are substantially perpendicular to both faces 20a and 20b.

A connector insertion portion 21 having a connector insertion hole 21a into which another connector 5 (refer to FIG. 4, insertion connector) is to be inserted is formed at one end side (first end) of the receptacle housing 20.

Additionally, an internal mechanism container 25 accommodating the internal mechanism 17 of the optical connector receptacle 10 therein is formed at the other end side (second end) of the receptacle housing 20.

As a configuration of the receptacle housing 20, an molding product which is integrally formed of various materials such as resin, metal, or the like may be adopted.

Furthermore, the receptacle housing 20 has a ferrule holder 21c (refer to FIG. 8A) holding the ferrule 11.

The connector insertion portion 21 has a pair of elastic locking claws 21b holding another connector 5 inside the connector insertion hole 21a.

Moreover, the receptacle housing 20 has the ferrule holder 21c holding the ferrule 11; the ferrule holder 21c includes a ferrule insertion hole 21d (refer to FIG. 8A) into which the ferrule 11 is to be inserted so that a connection edge face 11a (refer to FIG. 3) protrudes from the internal mechanism container 25 to the connector insertion hole 21a.

The elastic locking claws 21b are provided to protrude from the back of the connector insertion hole 21a to an opening side.

The ferrule 11 has a flange 11d, the flange 11d has a surface area that is greater than that of the ferrule insertion hole 21d and is provided close to a rear-edge face 11c.

As a result of allowing the flange 11d to come into contact with the ferrule holder 21c located at the peripheral edge of the ferrule insertion hole 21d, the ferrule 11 is held by the receptacle housing 20.

When another connector 5 is inserted into the connector insertion portion 21, an optical fiber that is inserted and fixed to the ferrule 11 of the optical connector receptacle 10 is optically spliced to the optical fiber that is inserted and fixed to a ferrule of another connector 5 (not shown in the figure).

As shown in FIGS. 1A and 2, flanges 22 protruding from the side faces 20c of the receptacle housing 20 and latches 23 formed along the side faces 20c of the receptacle housing 20 from the flanges 22 are formed, respectively, at an intermediate portion located between the connector insertion portion 21 of the receptacle housing 20 and the internal mechanism container 25.

In the case where the flanges 22 and the latches 23 (elastic deformation portion 23a, and the locking protruding portion 23b) are shaped integrally with the receptacle housing 20, it is possible to easily reduce the size of the optical connector receptacle, and thereby preferable.

In the drawing shown as an example, a recess (latch formation portion 24) in which the latch 23 is accommodated is formed on the side face 20c of the receptacle housing 20, and the latch 23 is apart from an external surface 24a of the latch formation portion 24.

The latch 23 is provided with the elastic deformation portion 23a extending from the flange 22 and the locking protruding portion 23b protruding from the front-end portion of the elastic deformation portion 23a to the side opposite to the external surface 24a of the latch formation portion 24.

The locking protruding portion 23b is formed closer to the connector insertion portion 21 than the flange 22.

It is only necessary that the flange 22 protrudes from the external surface 24a of the latch formation portion 24, the external surface of the flange 22 may be on the same plane as the external surface of the internal mechanism container 25 (the side face 20c of the receptacle housing 20), and the flange 22 may be formed of the step-difference portion formed between the latch formation portion 24 and the internal mechanism container 25.

Figure 4:
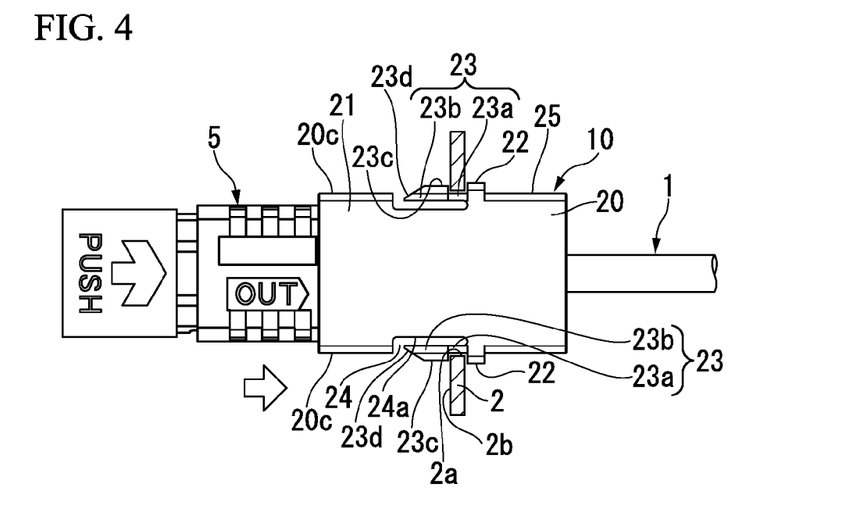
FIG. 4 is a plan view showing an example of a state where another connector inserted into the optical connector receptacle attached to the attachment hole.

As shown in FIGS. 1B and 4, when the optical connector receptacle 10 is inserted into an attachment hole 2a provided at an attachment wall 2 of an enclosure 3 or the like so that the connector insertion portion 21 is located at a front position, the latch 23 is stably formed at an peripheral edge 2b of the attachment hole 2a.

Particularly, as shown in FIG. 4, the distance between the flange 22 and the locking protruding portion 23b is the substantially same as the thickness of the attachment wall 2, the attachment wall 2 is sandwiched between the flange 22 and the locking protruding portion 23b, and the optical connector receptacle 10 is thereby attachable to the attachment wall 2.

The width of the connector insertion portion 21 (distance between both sides 20c of the receptacle housing 20) is less than the open width of the attachment hole 2a, and the distance between the external surfaces 23c of the locking protruding portions 23b of the latches 23 is greater than the open width of the attachment hole 2a.

Moreover, an inclined face 23d is formed at the front side of the external surface 23c of the locking protruding portion 23b where the width of the inclined face 23d gradually decreases while approaching the front side.

For this reason, when the optical connector receptacle 10 is inserted into the attachment hole 2a, the front-end portion of the latch 23 is accommodated in the attachment hole 2a without transforming the elastic deformation portion 23a; as the inclined face 23d comes into contact with the peripheral edge 2b of the attachment hole 2a, the elastic deformation portion 23a of the latch 23 deforms so as to move inside (so as to approach the external surface 24a of the latch formation portion 24.

Consequently, it is possible to push the locking protruding portion 23b toward the opposite side of the attachment hole 2a without separately operating the latch 23.

When the locking protruding portion 23b reaches the opposite side of the attachment hole 2a and the external surfaces 23c are apart from the peripheral edge 2b of the attachment hole 2a, the shape of the elastic deformation portion 23a is restored, the locking protruding portion 23b expands, and the optical connector receptacle 10 is maintained so as not to be removed from the attachment hole 2a.

As shown in FIGS. 1A, 1B, 8A, and 14, the flange 22 and the latch 23 (the locking protruding portion 23b) widen so as to be in the same range as the height of the receptacle housing 20 (the distance between the upper face 20a and the lower face 20b).

Consequently, even when the height of the optical connector receptacle 10 is low with respect to a bottom 3a of the enclosure 3 or the like, a contact portion having a sufficient length with respect to the peripheral edge 2b of the attachment hole 2a is obtained, and attachment reliability is improved.

Particularly, in FIG. 1B, the enclosure 3 or the like is provided with the bottom 3a or an outer-edge portion 3b under the attachment hole 2a; however, the bottom 3a and the outer-edge portion 3b are not essential for attachment, and the optical connector receptacle 10 can be attached to the attachment hole 2a without the bottom 3a or the outer-edge portion 3b.

The latch 23 is provided at the flange 22 so as to form a cantilever, and the locking protruding portion 23b is separated from the side face 20c of the receptacle housing 20.

In this case, it is only necessary to provide the elastic deformation portion 23a only on one side of the locking protruding portion 23b of the latch 23.

Figure 5:
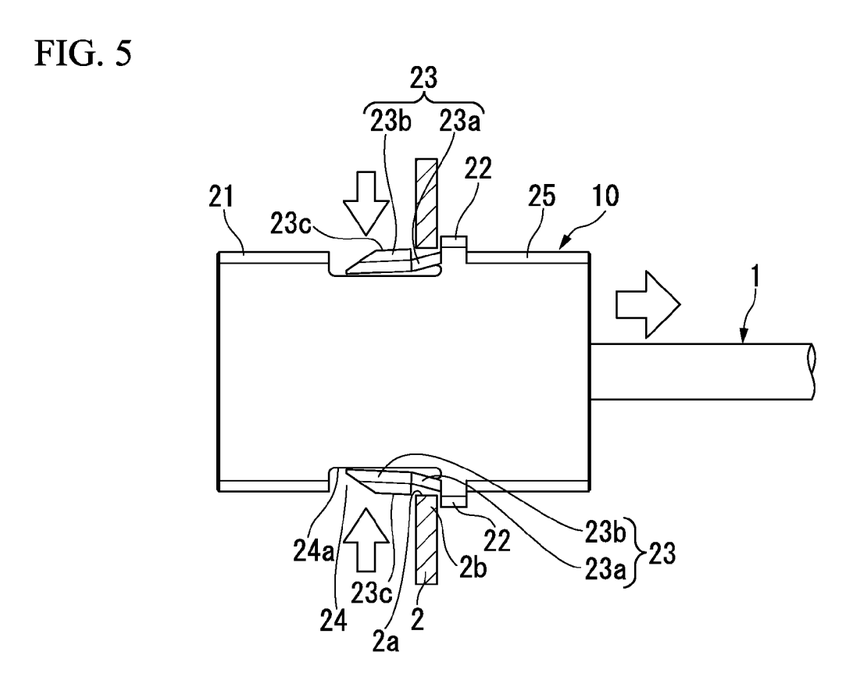
FIG. 5 is a plan view showing an example of a state where the optical connector receptacle is removed from the attachment hole.

When the optical connector receptacle 10 is removed from the attachment wall 2, the elastic deformation portion 23a is elastically deformed to be directed to the external surface 24a of the receptacle housing 20 by pressing the locking protruding portion 23b of the latch 23 as shown in FIG. 5, and it is possible to release a state where the locking protruding portion 23b is locked by the peripheral edge 2b of the attachment hole 2a.

Furthermore, when the optical connector receptacle 10 is pushed in the direction of a back side, the optical connector receptacle 10 is extruded from the attachment hole 2a and can be removed from the attachment wall 2.

According to the optical connector receptacle 10, when the optical connector receptacle 10 is removed from the attachment wall 2, since both operation of the latch 23 and pushing of the optical connector receptacle 10 can be carried out at the same side (the side where the connector insertion portion 21 is provided) with respect to the attachment wall 2, workability is excellent.

The locking protruding portion 23b can be pressed by, for example, operator's finger or jig.

Figure 3:
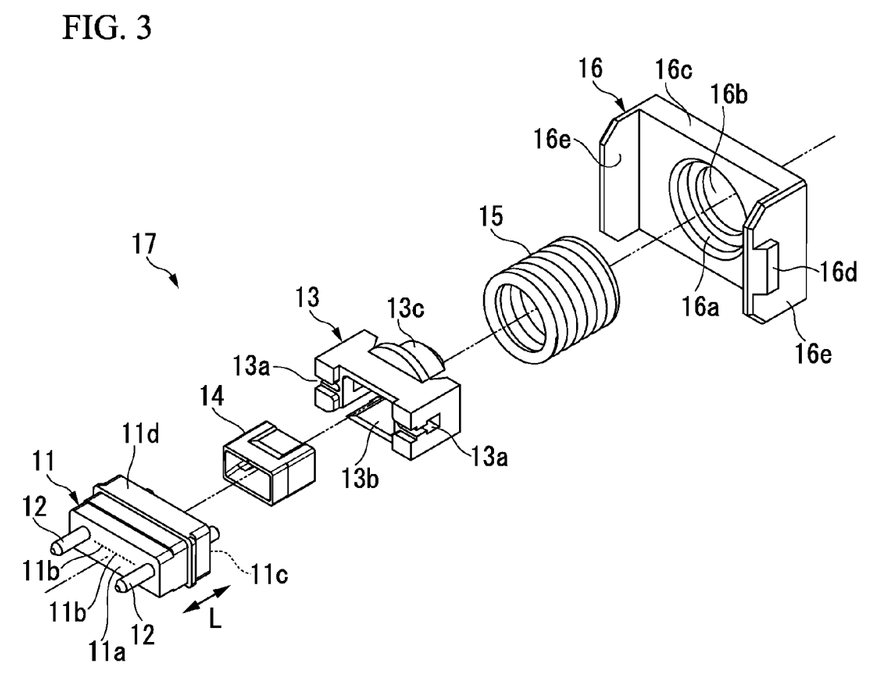
FIG. 3 is an exploded perspective view showing an internal mechanism of the optical connector receptacle shown in FIG. 1A.

As shown in FIGS. 2 and 3, the internal mechanism 17 of the optical connector receptacle 10 is provided with: the ferrule 11; a ferrule boot 14 that is provided at the rear side of the ferrule 11; a pin clamp 13 that prevents fitting pins 12 from being removed; a spring 15 that presses against the ferrule 11 from the back side to the front side via the pin clamp 13; and a spring pusher 16 that restricts movement of the spring 15 toward the back side.

The ferrule 11 is provided with one or more optical fibers holes 11b that open at the connection edge face 11a which is located at the front side.

The bare optical fibers 1a (refer to FIG. 12) that are located at the front end of the aforementioned optical fiber 1 are fixed to the optical fiber holes 11b with adhesive or the like.

One or more fitting pins 12 protrude from the connection edge face 11a of the ferrule 11.

According to this kind of pin-fitted ferrule (for example, refer to JIS C 5964-7 "Fiber optic connector interfaces-Part 7: Type MPO connector family (F13)"), a fitting pin protruding from one ferrule, and a hole (pin insertion hole) to which the fitting pin to be fitted is provided at another ferrule.

When a pair of the ferrules face each other and the connection edge faces are butt-jointed to each other, the positions of the optical fibers that are held by the optical fiber holes, respectively, are precisely fixed by inserting the fitting pin into the pin insertion hole.

In both ferrules, the pin insertion holes may be a through hole penetrating through the connection edge face 11a and the rear-edge face 11c.

As a method of attaching a fitting pin to a ferrule, a method is adopted, in which the front-end portions of the fitting pins 12, which are inserted into the ferrule 11 through the rear-edge face 11c, protrude from the connection edge face 11a, the back-end portion of the fitting pins 12 is held to a pin fixing portion 13a of the pin clamp 13 by clamping, and the fitting pins 12 are thereby provided in the ferrule.

In other cases, a method of adhesively attaching a fitting pin to a ferrule, a method of implanting a fitting pin into a ferrule during molding of the ferrule, or the like may be adopted.

In order to protect the optical fiber 1 (the bare optical fiber 1a or a tape-shaped portion 1b) that are exposed to the rear side of the ferrule 11, the ferrule boot 14 is provided at the rear side of the ferrule 11.

The front-end side of the boot 14 is inserted into the ferrule 11, and the back-end side of the boot 14 is accommodated in a boot container 13b of the pin clamp 13.

The spring 15 pressing against the ferrule 11 is provided between the pin clamp 13 and the spring pusher 16.

The spring 15 is formed of, for example, a compression coil spring.

The front-end portion of the spring 15 is attached to a spring applied part 13c that is located at the back-end side of the pin clamp 13, and the back-end portion of the spring 15 is attached to a spring applied part 16a of the spring pusher 16.

When connectors are coupled to each other, as the spring 15 is compressed, the ferrule 11 is pressed to be directed to the front side, and a push pressure is thereby applied to the connection edge face 11a of the ferrule 11.

Figure 14:
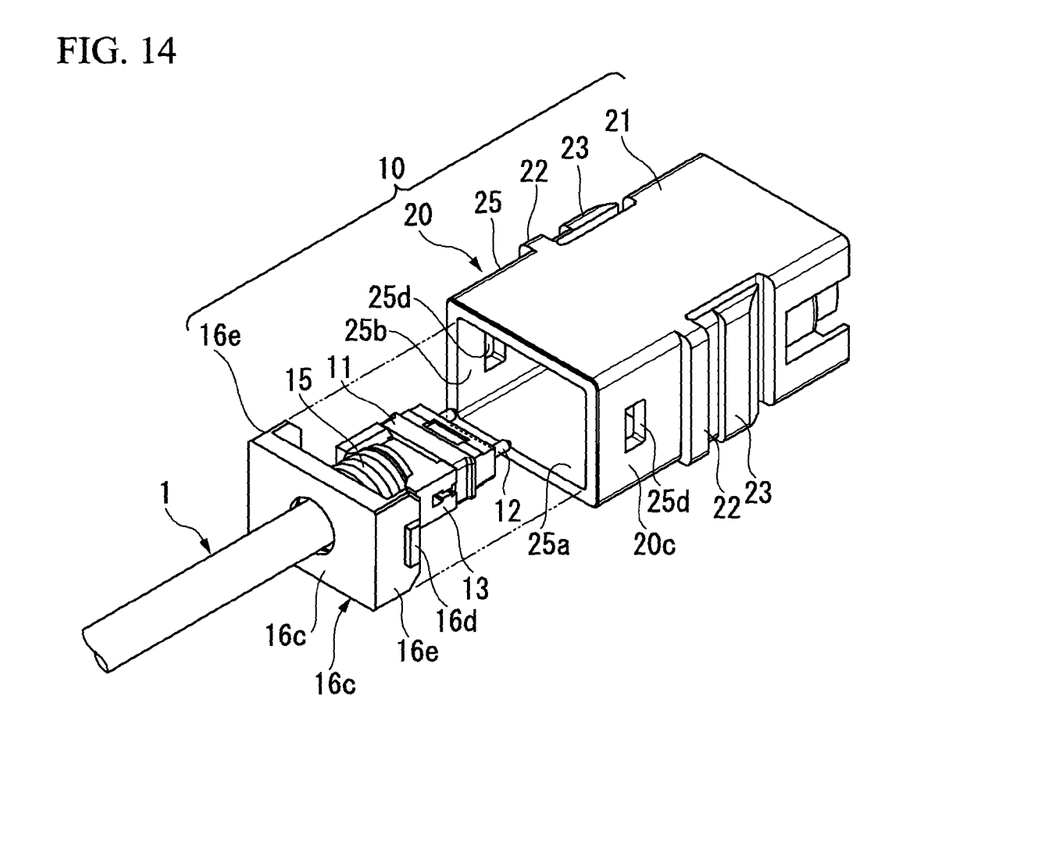
FIG. 14 is a perspective view showing a state where a spring pusher is attached to an internal mechanism container.

As shown in FIGS. 2 and 14, the receptacle housing 20 has opening portions 25a at the end of the internal mechanism container 25 on the opposite side of the connector insertion portion 21 into which another connector is to be inserted.

In addition, the spring pusher 16 is provided with a substrate portion 16c having a through hole 16b through which the optical fiber 1 passes, and bend portions 16e that bend from both right and left sides of the substrate portion 16c and extend toward the front side.

The spring applied part 16a of the spring pusher 16 is provided at a peripheral edge of the through hole 16b of the substrate portion 16c through which the optical fiber 1 passes, and it possible to allow the optical fiber 1 to pass through the inside of the spring 15.

The bend portions 16e bend so as to extend along inner faces 25b of the internal mechanism container 25, and locking claws 16d protruding from outer faces of the bend portions 16e are engaged with engagement portions 25d. The engagement portions 25d are formed on both side faces 20c of the receptacle housing 20 (particularly, the internal mechanism container 25), respectively.

Consequently, the substrate portion 16c blocks the opening portion 25a of the receptacle housing 20 and the spring pusher 16 is fixed to the receptacle housing 20.

Here, the engagement portion 25d is formed in a window shape opening at the side face 20c; however, it may be a recess that has a bottom and is formed on an inner face of the receptacle housing 20.

As described above, while preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

Figure 6:
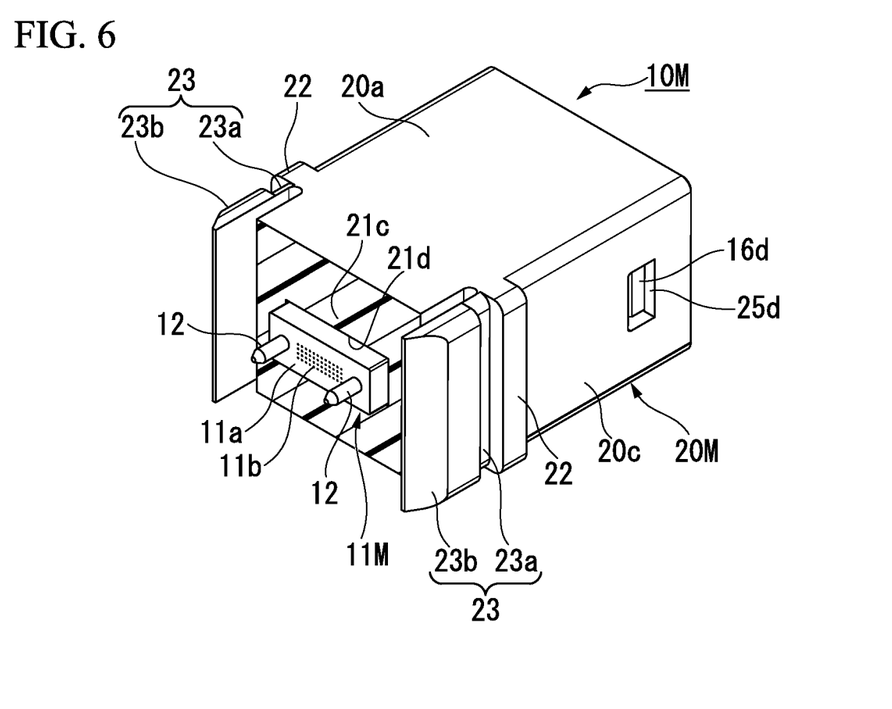
Figure 7:
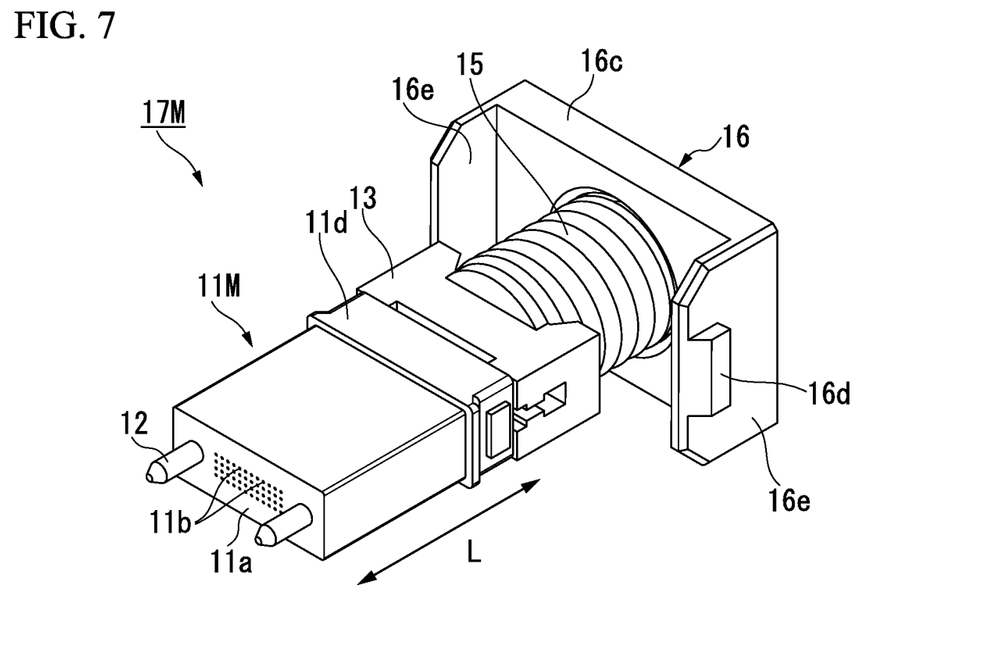
FIG. 7 is a perspective view illustrating the optical connector receptacle internal mechanism shown in FIG. 6.

In the case of an optical connector receptacle 10M shown in FIGS. 6 and 7, the optical fiber holes 11b that open at the connection edge face 11a of a ferrule 11M are longitudinally and laterally arranged so as to form a plurality of rows on the connection edge face 11a.

In FIG. 6, in order to visually understand the ferrule 11M, a connector insertion portion (refer to reference numeral 21 in FIG. 2) is ideally removed from the receptacle housing 20M, and a cutting plane is represented by hatched lines.

In the ferrule 11M shown as an example in the drawing, twelve optical fiber holes 11b per row and four rows thereof are formed.

The number of optical fiber holes per row and the number of rows can be suitably modified.

When the structure of the receptacle housing 20M is compared with the receptacle housing 20 shown in FIGS. 1A, 1B, and 2, the longer the length of the ferrule 11M, the longer the length of the receptacle housing 20M, however, the receptacle housing 20M can be realized without particularly modifying the other structure.

Also, regarding the internal mechanism 17M of the optical connector receptacle 10M, the parts other than the ferrule 11M may be the same as that of FIGS. 2 and 3.

The length L of the ferrule 11M shown in FIG. 7 is the same as that of a ferrule (refer to JIS C 5981) used in a common MT connector such as 8 mm; however, as shown in FIG. 3, a ferrule 11 having the length L shorter than that of the ferrule shown in FIG. 7 may be adopted.

If the length of the ferrule is short, it is possible to similarly shorten the length of the connector housing (for example, 3.5 mm or the like); as shown in FIG. 1B, the space of the enclosure 3 in which the optical connector receptacle is disposed can be reduced.

In the optical connector receptacle 10 shown in FIGS. 1A and 1B, in the connector insertion portion 21, opening portions 21s are formed at both sides 20c of the receptacle housing 20.

Figure 8A:
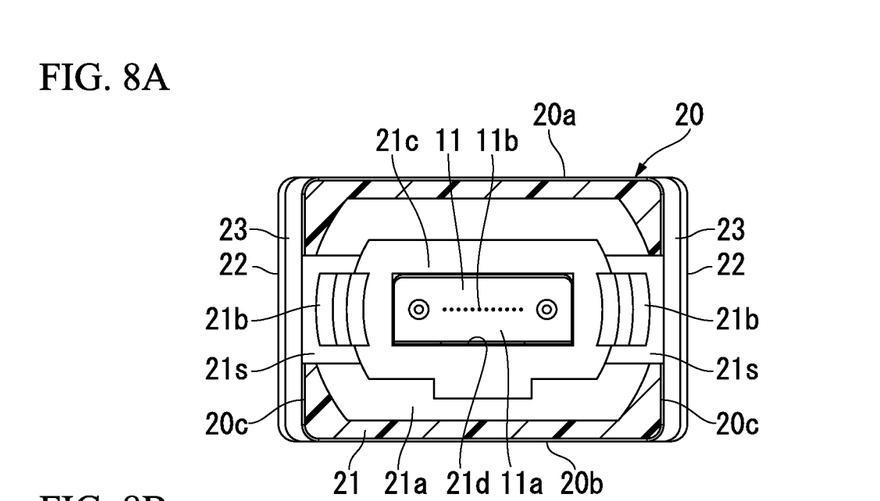
FIG. 8A is a front view showing a connector insertion portion.

As shown in FIG. 8A, the opening portions 21s are formed near the elastic locking claws 21b, respectively; and it is not necessary to ensure the thickness of a side wall.

Figure 8B:
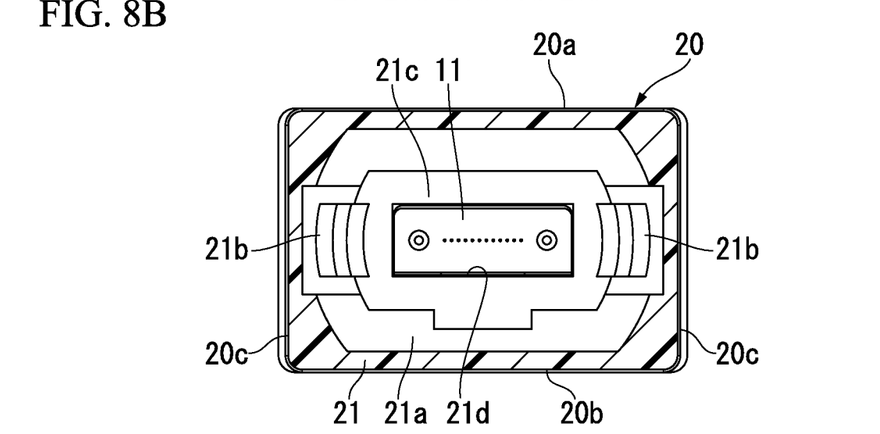
FIG. 8B is a front view showing a connector insertion portion.

Because of this, the width of the connector insertion portion 21 (the distance between both sides 20c of the receptacle housing 20) can be lower than that in the case where walls are provided near the elastic locking claws 21b as shown in FIG. 8B.

Figure 8C:
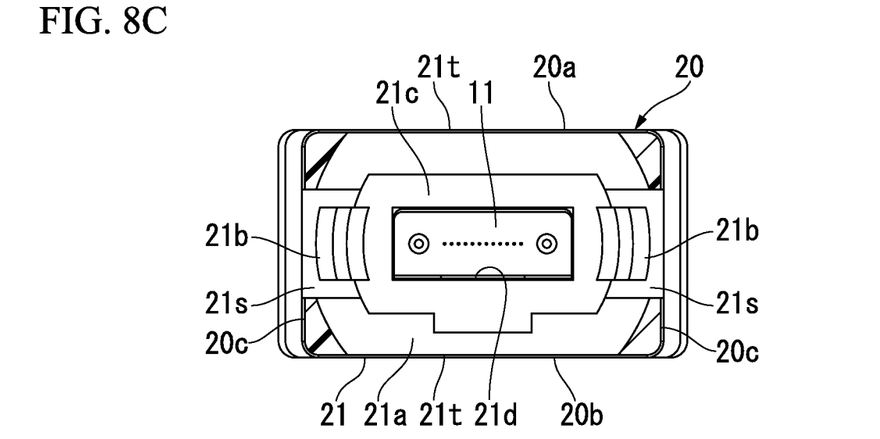
FIG. 8C is a front view showing a connector insertion portion.

In the case shown in FIG. 8C, opening portions 21t are also formed on the upper face 20a and the lower face 20b of the receptacle housing 20.

In this case, the height of the connector insertion portion 21 (the distance between the upper face 20a and the lower face 20b of the receptacle housing 20) can be reduced.

In FIGS. 8A to 8C, the cross-sectional face of the connector insertion portion 21 is represented by hatched lines.

Figure 9:
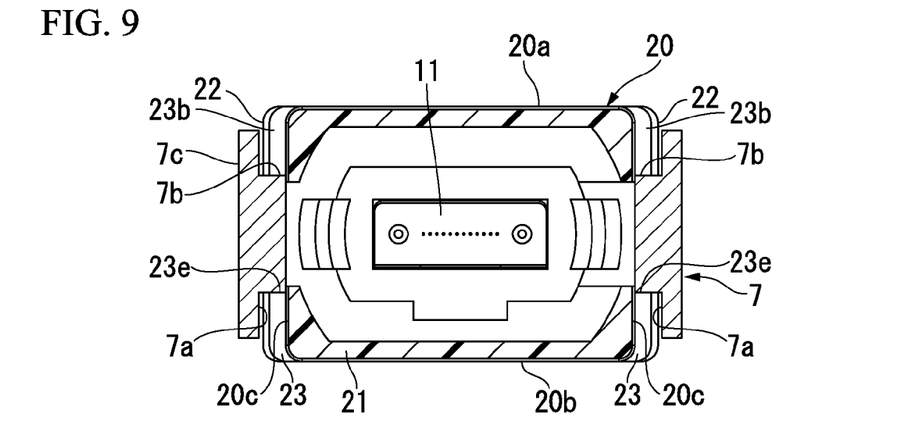
FIG. 9 is a front view showing a modified example of a configuration in which latches are sandwiched by a jig.
Figure 10:
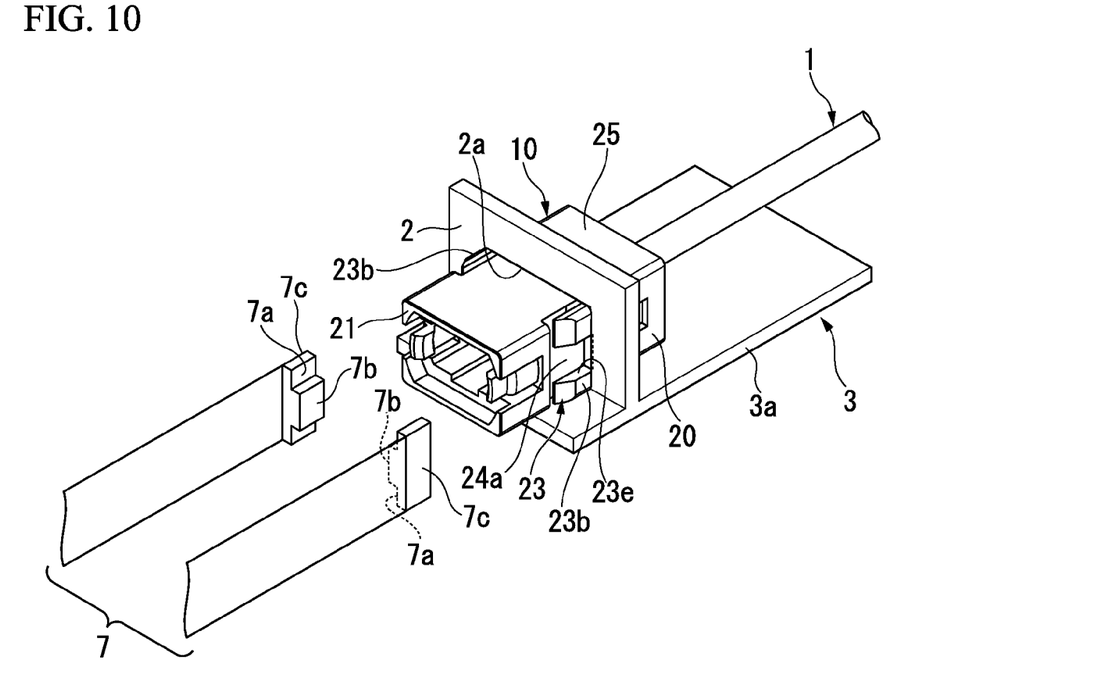
FIG. 10 is a perspective view showing a modified example of a configuration in which latches are sandwiched by a jig.

In an optical connector receptacle shown in FIGS. 9 and 10, recesses 23e such as a groove, a cut-off portion, or the like are formed at the latch 23 (particularly, the locking protruding portion 23b).

When the optical connector receptacle 10 is removed from the attachment wall 2 (refer to FIG. 5), a jig 7 pressing the locking protruding portion 23b is used; the jig 7 is configured to include a pair of pressing portions 7c and protrusions 7b protruding from a pressing face 7a; and the jig 7 causes the protrusions 7b to be inserted to the recesses 23e, respectively, and thereby can reliably press the locking protruding portion 23b.

In the drawing shown as an example, in each latch 23, the recess 23e is formed so as to penetrate through the latch 23 in the thickness direction thereof and so that the locking protruding portion 23b is divided into two, i.e., a fork shape.

In FIG. 9, the cross-sectional faces of the connector insertion portion 21 and the pressing portions 7c of the jig 7 are represented by hatched lines, and the attachment wall 2 is omitted.

Moreover, the jig 7 is schematically shown in FIG. 10.

The jig 7 may have a constitution that fixes the positions of the pressing portions 7c by utilizing a step-difference formed at the flange 22 or the like.

Figure 11:
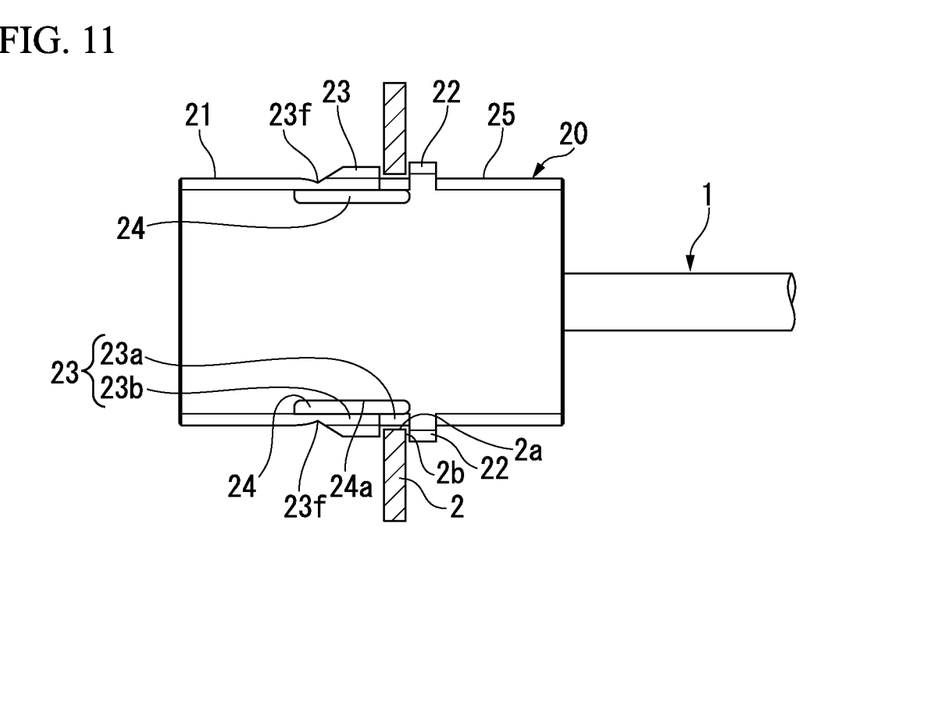
FIG. 11 is a plan view showing a modified example of a state where a front-end side of a latch is coupled to a front portion of a housing.

In the optical connector receptacle shown in FIG. 11, the end of the latch 23 (particularly, the locking protruding portion 23b) is coupled to the receptacle housing 20 via a connection portion 23f.

The latch formation portion 24 has a slit-shaped gap between the external surface 24a and the latch 23 when seen in a plan view.

In this case, as a result of elastically deforming both the connection portion 23f which is provided close to the front end and the elastic deformation portion 23a which is provided close to the flange, the locking protruding portion 23b comes close to the external surface 24a of the receptacle housing 20, similar to the case of FIG. 5, and the latch 23 can be in a state of not being locked to the attachment hole 2a.

Figure 13:
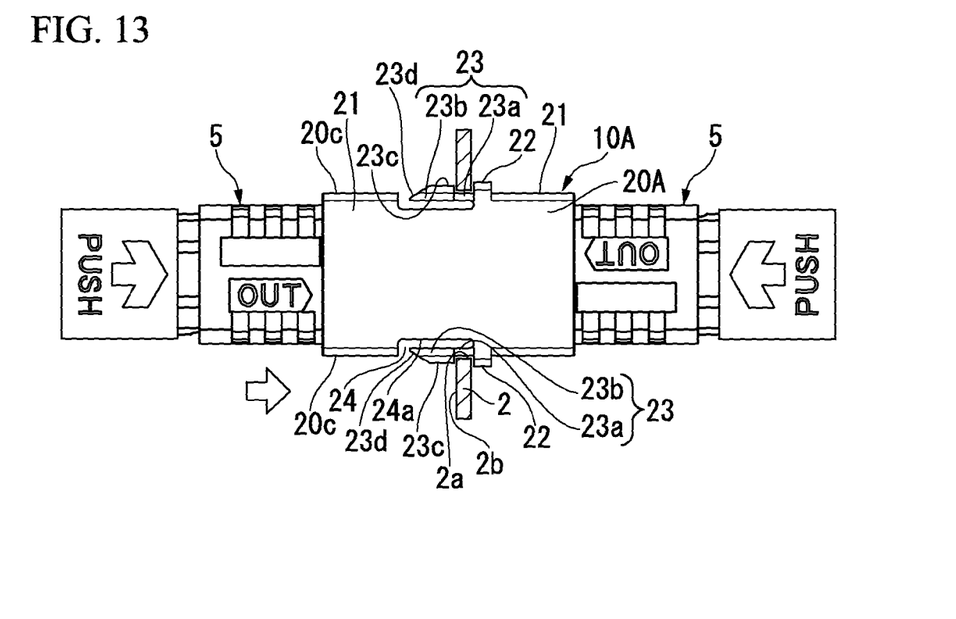
FIG. 13 is a plan view showing an example of an optical connector adapter of the invention.

The optical connector adapter 10A shown in FIG. 13 includes a pair of connector insertion portions 21, into which another connector 5 is inserted, and which are provided at ends of an adapter housing 20A.

Similar to the receptacle housing 20 or the like shown in FIG. 1A, the adapter housing 20A includes: the flange 22 protruding from the side face 20c of the adapter housing 20A; and the latch 23 formed along the side face 20c of the adapter housing 20A from the flange 22.

In the case where the flange 22 and the latch 23 (the elastic deformation portion 23a and the locking protruding portion 23b) are molded integrally with the adapter housing 20A, it is possible to easily reduce the size of the optical connector adapter and thereby preferable.

The structure of a pair of connector insertion portions 21 of the adapter can be suitably designed depending on how the structure or the like of another connector 5 is adopted, it is not limited to a specified design; for example, similar to the receptacle shown in FIG. 1A, the structure may include a connector insertion hole 21a, elastic locking claws 21b, or the like.

Similar to the constitution shown in FIGS. 8A to 8C, the opening portions 21s and 21t may be provided on the side faces of the connector insertion portion 21, and the side faces may be blocked.

Furthermore, in the drawings shown as an example, similar to the receptacle housing 20 or the like shown in FIG. 1.A, a recess (the latch formation portion 24) in which the latch 23 is accommodated is formed at the side face 20c of the adapter housing 20A, and the latch 23 is apart from the external surface 24a of the latch formation portion 24.

In other cases, a sleeve or the like (not shown in the figure) which guides both ferrules of optical connectors may be provided inside the adapter.

In the case of also applying the invention to an adapter, similar to the case of the receptacle, replacement with respect to the attachment hole (refer to reference numeral 2a in FIG. 1B) is easily performed, and it is possible to realize a configuration in which the size of an optical connector adapter can be easily reduced.

The constitution of the latch 23 in the optical connector adapter can also be modified in a way similar to the case of using the optical connector receptacle.

For example, as shown in FIGS. 9 and 10, the recess 23e, into which the protrusion 7b protruding from the pressing face 7a of the jig 7 pressing the locking protruding portion 23b, may be provided; or a structure may be adopted in which the front end of the latch 23 is coupled to the adapter housing via the connection portion 23f as shown in FIG. 11.

As an attachment wall, to which the optical connector receptacle, the receptacle housing, the optical connector adapter, and adapter housing of the invention are attached, enclosures of various devices such as devices for optical communications (for example an optical module, a wire tray, or the like; electrical appliances; electronic devices or the like), a backplane of a backplane connector, or the like are adopted.

What is claimed is:

1. An optical connector receptacle comprising:
    a ferrule to which an optical fiber is inserted and fixed;
    a receptacle housing holding the ferrule;
    a flange protruding from an external surface of the receptacle housing;
    an elastic deformation portion extending from the flange along the external surface of the receptacle housing; and
    a locking protruding portion protruding from the elastic deformation portion to the opposite side of the external surface of the receptacle housing, wherein
    the flange, the elastic deformation portion, and the locking protruding portion are formed integrally with the receptacle housing,
    the optical connector receptacle is attachable to an attachment wall by sandwiching a peripheral edge of an attachment hole of the attachment wall between the flange and the locking protruding portion, and
    a state where the locking protruding portion is locked by the peripheral edge of the attachment hole of the attachment wall is releasable as a result of elastically deforming the elastic deformation portion to be directed to the external surface of the receptacle housing.

2. The optical connector receptacle according to claim 1, wherein
    the elastic deformation portion extends from the flange so as to be formed in a cantilever shape.

3. The optical connector receptacle according to claim 1, wherein
    the locking protruding portion is formed at a connector insertion portion side into which another connector is inserted with respect to the flange.

4. The optical connector receptacle according to claim 1, wherein
    the locking protruding portion has a recess into which a protrusion is to be inserted, and the protrusion protrudes from a pressing face of a jig pressing the locking protruding portion.

5. The optical connector receptacle according to claim 1, wherein
    the optical fiber includes a portion having a tape-shaped multi-core.

6. The optical connector receptacle according to claim 1, wherein
    the receptacle housing comprises: a spring pressing against the ferrule; and an internal mechanism container accommodating a spring pusher receiving the spring.

7. The optical connector receptacle according to claim 6, wherein
the receptacle housing has an opening portion at an end of the internal mechanism container opposite to a connector insertion portion into which another connector is inserted,
the spring pusher comprises: a substrate portion blocking the opening portion; a bend portion bending from an end of the substrate portion along an inner surface of the internal mechanism container; and a locking claw protruding from the bend portion, and
the receptacle housing comprises an engagement portion engaging with the locking claw at a side surface of the internal mechanism container.

8. The optical connector receptacle according to claim 6, wherein
the spring pusher has a through hole, through which the optical fiber passes, and has a spring applied part receiving the spring at a peripheral edge of the through hole.

9. A receptacle housing comprising:
a ferrule holder holding a ferrule to which an optical fiber is inserted and fixed;
a flange protruding from an external surface of the receptacle housing;
an elastic deformation portion extending from the flange along the external surface; and
a locking protruding portion protruding from the elastic deformation portion to the opposite side of the external surface, wherein
the flange, the elastic deformation portion, and the locking protruding portion are formed integrally with the ferrule holder,
the receptacle housing is attachable to an attachment wall by sandwiching a peripheral edge of an attachment hole of the attachment wall between the flange and the locking protruding portion, and
a state where the locking protruding portion is locked by the peripheral edge of the attachment hole of the attachment wall is releasable as a result of elastically deforming the elastic deformation portion to be directed to the external surface.

10. The receptacle housing according to claim 9, wherein the elastic deformation portion extends from the flange so as to be formed in a cantilever shape.

11. The receptacle housing according to claim 9, wherein the locking protruding portion is formed at a connector insertion portion side into which another connector is inserted with respect to the flange.

12. The receptacle housing according to claim 9, wherein the locking protruding portion has a recess into which a protrusion is to be inserted, and the protrusion protrudes from a pressing face of a jig pressing the locking protruding portion.

13. The receptacle housing according to claim 9, wherein the receptacle housing comprises: a spring pressing against the ferrule; and an internal mechanism container accommodating a spring pusher receiving the spring.

14. An optical connector adapter comprising:
an adapter housing comprising a pair of connector insertion portions having ends into which other connectors are to be inserted;
a flange protruding from an external surface of the adapter housing;
an elastic deformation portion extending from the flange along the external surface of the adapter housing; and
a locking protruding portion protruding from the elastic deformation portion to the opposite side of the external surface of the adapter housing, wherein
the flange, the elastic deformation portion, and the locking protruding portion are formed integrally with the adapter housing,
the optical connector adapter is attachable to an attachment wall by sandwiching a peripheral edge of an attachment hole of the attachment wall between the flange and the locking protruding portion, and
a state where the locking protruding portion is locked by the peripheral edge of the attachment hole of the attachment wall is releasable as a result of elastically deforming the elastic deformation portion to be directed to the external surface of the adapter housing.

15. The optical connector adapter according to claim 14, wherein
the elastic deformation portion extends from the flange so as to be formed in a cantilever shape.

16. The optical connector adapter according to claim 14, wherein
the locking protruding portion has a recess into which a protrusion is to be inserted, and the protrusion protrudes from a pressing face of a jig pressing the locking protruding portion.

17. An adapter housing comprising:
a pair of connector insertion portions having ends into which other connectors are to be inserted;
a flange protruding from an external surface of the adapter housing;
an elastic deformation portion extending from the flange along the external surface; and
a locking protruding portion protruding from the elastic deformation portion to the opposite side of the external surface, wherein
the flange, the elastic deformation portion, and the locking protruding portion are formed integrally with the pair of connector insertion portions,
the adapter housing is attachable to an attachment wall by sandwiching a peripheral edge of an attachment hole of the attachment wall between the flange and the locking protruding portion, and
a state where the locking protruding portion is locked by the peripheral edge of the attachment hole of the attachment wall is releasable as a result of elastically deforming the elastic deformation portion to be directed to the external surface.

18. The adapter housing according to claim 17, wherein the elastic deformation portion extends from the flange so as to be formed in a cantilever shape.

19. The adapter housing according to claim 17, wherein the locking protruding portion has a recess into which a protrusion is to be inserted, and the protrusion protrudes from a pressing face of a jig pressing the locking protruding portion.

* * * * *